(No Model.)

J. C. AYER.
LOOM TEMPLE.

No. 488,917. Patented Dec. 27, 1892.

Witnesses.
Fred N. Ashworth
Fred S. Greenleaf

Inventor:
John C. Ayer
by Crosby & Gregory
Attys

UNITED STATES PATENT OFFICE.

JOHN C. AYER, OF LEICESTER, ASSIGNOR TO THE DUTCHER TEMPLE COMPANY, OF HOPEDALE, MASSACHUSETTS.

LOOM-TEMPLE.

SPECIFICATION forming part of Letters Patent No. 488,917, dated December 27, 1892.

Application filed August 23, 1892. Serial No. 443,862. (No model.)

*To all whom it may concern:*

Be it known that I, JOHN C. AYER, of Leicester, county of Worcester, State of Massachusetts, have invented an Improvement in Loom-Temples, of which the following description, in connection with the accompanying drawings, is a specification, like figures on the drawings representing like parts.

This invention is intended as an improvement on that described in my application Serial No. 421,365 filed February 13, 1892. The temple roller described therein has a series of toothed sliding bars which stretch the material widthwise, and the selvage is caught and held out by the teeth of a star-wheel arranged to rotate about a vertical stud located between the temple roller and the breast beam. To simplify said apparatus I have transferred the star-wheel to rotate about the stud constituting the center of motion of the temple roller, and have so modified said star-wheel as to adapt it to its new location.

My invention consists in the combination with a roller temple having toothed sliding bars and a cam to operate them,—of a star-wheel adapted to rotate about the same center as the temple roller, substantially as will be described.

Figure 1:
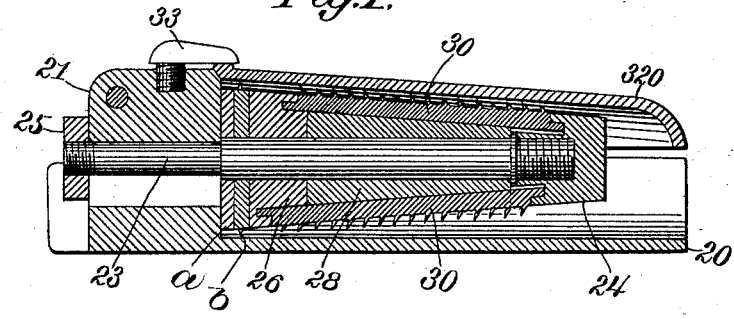
Figure 2:
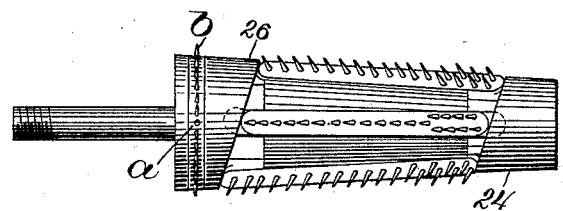

Figure 1, in longitudinal vertical section shows part of a temple head and temple roller embodying my invention; and Fig. 2, in elevation shows the roller detached.

The foot 20 of the temple head, it having an upright lug 21, the cap 320, the locking device 33 for the cap, the stud 23 held in the upright 21 by nut 25, the cam nut 24, the temple roll 28, and the toothed sliding bars 30, are and may be all as in said application. Herein the cam 26 for sliding the bars has combined with it a star wheel $a$, having a series of needle-pointed teeth to engage the cloth between its selvage and the part engaged by the teeth of the bars 30 and aid in keeping the said cloth properly distended.

Having described my invention, what I claim and desire to secure by Letters Patent, is:—

The combination with a temple roller having toothed sliding bars, and a cam device for actuating said bars, of a star-wheel rotating about the center about which the temple roller rotates, substantially as described.

In testimony whereof I have signed my name to this specification in the presence of two subscribing witnesses.

JOHN C. AYER.

Witnesses:
FRANK J. DUTCHER,
GEORGE E. STIMPSON.